Figure 3:
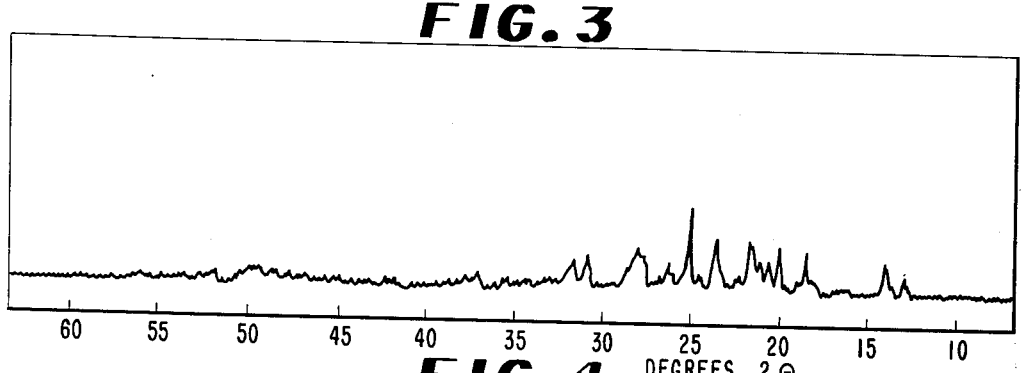

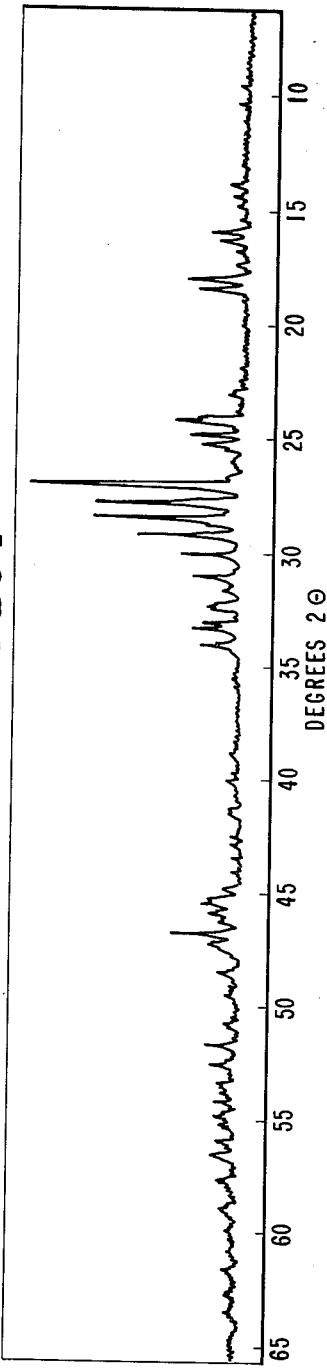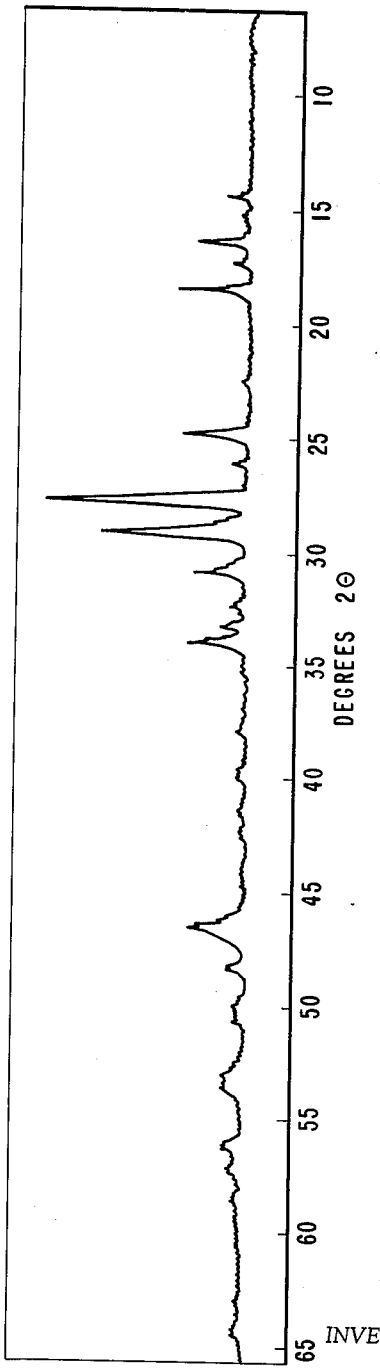
FIG. 1
FIG. 2
INVENTOR
HANS J. BORCHARDT

DEGREES 2θ

DEGREES 2θ

DEGREES 2θ

May 10, 1966 H. J. BORCHARDT 3,250,722
LUMINESCENT SOLID SOLUTIONS OF EUROPIUM COMPOUNDS
WITH AT LEAST ONE OTHER RARE EARTH COMPOUND
Filed April 6, 1962 3 Sheets-Sheet 3

FIG. 6

LUMINOPHOR ADHEARED TO GLASS
GLASS PROTECTIVE LAYER

FIG. 7

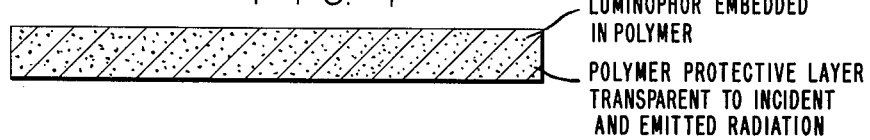
LUMINOPHOR EMBEDDED IN POLYMER
POLYMER PROTECTIVE LAYER TRANSPARENT TO INCIDENT AND EMITTED RADIATION

FIG. 8

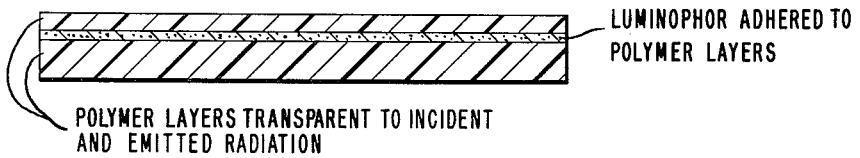
LUMINOPHOR ADHERED TO POLYMER LAYERS
POLYMER LAYERS TRANSPARENT TO INCIDENT AND EMITTED RADIATION

INVENTOR
HANDS J. BORCHARDT

BY *John R. Schmidt*
ATTORNEY

United States Patent Office 3,250,722
Patented May 10, 1966

3,250,722
LUMINESCENT SOLID SOLUTIONS OF EUROPIUM COMPOUNDS WITH AT LEAST ONE OTHER RARE EARTH COMPOUND
Hans J. Borchardt, Wilmington, Del., assignor to E. I. du Pont de Nemours and Company, Wilmington, Del., a corporation of Delaware
Filed Apr. 6, 1962, Ser. No. 186,602
9 Claims. (Cl. 252—301.5)

This application is a continuation-in-part of my copending application Serial No. 150,477, filed November 6, 1961, now abandoned.

This invention relates to chemical compositions and, more particularly, to luminescent compositions.

Luminescent materials, including phosphorescent and fluorescent materials, have found wide acceptance in the art in such uses as TV tubes, fluorescent lights, radiation detectors, radarscopes, and other detection devices. Such luminescent materials, that is, luminophors, emit radiation, for example, visible radiation, on excitation with ultraviolet light, X-rays, cathode rays, and the like. Examples of such commercial luminophors are calcium tungstate, copper-activated zinc cadmium selenide, barium-lead sulfate, silver-activated zinc sulfide, titanium-activated alkaline earth selenides and manganese-activated zinc-beryllium silicate.

Commercial luminophors have been subject to several limitations. First, they are hypersensitive to impurities. Not only does such sensitivity present problems as far as use is concerned, but in addition, it presents great problems in the preparation of the luminophors. Small portions of impurity materials introduced either during use or during preparation markedly alter the luminescence of such commercial luminescent materials. Second, some luminophors, such as selenides and arsenides, are highly toxic and thus create hazards during processing and potential hazards in use. Third, completely satisfactory phosphors are not available in all colors; to date, no completely satisfactory bright red luminophor has been obtained.

Rare earth elements have been used in the preparation of lucinescent materials. In the art, such rare earth elements have been used as activators, that is, they have been used as intentionally added "impurity" materials. For example, alkaline earth silicates have been activated with minute quantities of rare earth elements. The characteristic feature of such prior art luminophors is that the minute quantities of rare earth activator incorporated therein are employed to produce band emission by causing defects in the host crystal lattice and emission from the defective region in the vicinity of the "impurity" atoms.

Optimum luminescent properties are conventionally obtained in phosphors with proportions of activating material on the order of 0.0001 to 0.01 mole of activator per mole of base material. In general, with conventional phosphors, increasing the proportion of the "impurity" activator decreases luminescent intensity, and in some cases, quenches it. Conventional rare earth activated luminophors quench out quite rapidly when the rare earth activator concentration is increased to levels in excess of one mole percent because of activator-activator interaction.

In accordance with this invention, it has been discovered that a unique group of materials emit exceptionally bright red light on excitation, are easy to prepare and are remarkably insensitive to impurities both during preparation and use; hence, the aforementioned materials are eminently suited for use in luminescent coatings, compositions and luminescent articles fabricated therefrom.

The luminescent materials employed in accordance with this invention consist essentially of substantially colorless luminophor composed of two rare earth-containing components, one rare earth component containing europium and the second rare earth component containing at least one element selected from the group consisting of scandium, yttrium, lanthanum, samarium, gadolinium, terbium, dysprosium and lutetium, said europium component being present in solid solution with said second rare earth component, the europium being associated with an oxygen-containing anion common with that associated with the rare earth in said second rare earth component in the solid solution in which it is contained and the europium being present within the range of about from 3 to 80 mole percent of the total rare earth ions present in such solid solution, said second rare earth component containing about from 25 to 100 mole percent of at least one of the group consisting of scandium, yittrium, lanthanum, gadolium, terbium and lutetium based on the total rare earth ions in said second rare earth component.

Luminescent articles of this invention comprise (a) at least one of the aforementioned luminescent materials, optionally in admixture with other luminescent materials, intimately associated with (b) a protective layer of a material transparent to radiation emitted by the aforementioned luminescent materials.

As indicated above, scandium and yttrium, as well as lanthanum, samarium, gadolinium, terbium, dysprosium, lutetium and europium are considered as rare earth elements herein. The terms "anion" and "cation" as used herein are used to describe the stoichiometry of the solid solutions comprising the luminophors employed in this invention, but not necessarily the precise bonding of the elements in such solid solutions.

In the accompanying drawings, FIGURES 1 to 5 are X-ray patterns obtained as described hereinafter in the analysis of luminophors employed in this invention; and FIGURES 6 to 8 are illustrative cross-sections of various luminescent articles prepared in accordance with this invention.

The luminophors of this invention are prepared by initimately mixing a rare earth compound containing Eu+3 as the cationic (i.e., rare earth) species, at least one other compound containing one of the rare earth elements in the aforementioned second rare earth component as the cationic species and, in most cases, an oxyanion-yielding ingredient, and heating the resulting mixture in a non-reducing atmosphere such as air, at a temperature of at least about 700° C., usually at least about 900° C., and preferably 1000–1500° C., but below the fusion temperature of the mass, for a period usually of at least 30 minutes, and preferably about from 1 to 4 hours.

The luminophors employed in this invention can be of two general types. Solid solutions of europium oxide in an oxide of the second rare earth component, that is, solid solutions of the formula:

and solid solutions of the formula:

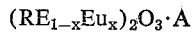

wherein RE represents at least one rare earth element selected from the group consisting of scandium, yttrium, lanthanum, samarium, gadolinium, terbium, dysprosium and lutetium, about from 25 to 100 mole percent of RE being selected from the group consisting of scandium, yttrium, lanthanum, gadolinium, terbium and lutetium, x is 0.03 to 0.8 and A is an oxyanion. Solid solutions of the formula $(RE_{1-x}Eu_x)_2O_3 \cdot A$ are preferred and are new compositions of matter. Such solid solutions are generally less expensive than other luminophors employed herein and encompass some of the brightest luminescent materials used in this invention. In addition, the oxyanion, A, provides added freedom in varying absorption and response of such luminophors to different excitation. Illustrative oxyanions, that is, oxygen-containing complex anions, are those of tungsten, molybdenum, silicon, aluminum, boron, gallium, germanium and phosphorus. The luminophors should be high melting, e.g., melt above about 700° C., substantially colorless, crystalline solids. Rare earth phosphates and borates and rare earth compounds having metal-containing oxyanions, particularly those of tungsten and molybdenum, are especially preferred because luminophors thereof have an optimum combination of such properties.

As stated hereinbefore, the luminophors of this invention are solid solutions. They can be viewed as solid solutions of an europium compound and at least one cognate compound of a rare earth element of the aforementioned second rare earth component. Stated differently, they can be viewed as a crystal lattice of at least one of lanthanum, gadolinium, terbium, lutetium, scandium and yttrium oxide, or an oxyanionic compound of these rare earths, in which atoms of europium are substituted for the aforementioned rare earth elements. Preferably, the luminophors of this invention consist of only one phase. However, they can contain more than one phase each having europium in solid solution. For example, the luminophors of this invention encompass systems containing $(Y_{1-x}Eu_x)_2O_3 \cdot WO_3$ and $(Y_{1-x}Eu_x)_2O_3 \cdot 3WO_3$ which are phases capable of coexistence in the $Y_2O_3$-$Eu_2O_3$-$WO_3$ system and each of which in itself is a luminescent solid solution containing europium. Hence, when reference is made herein to europium being present in solid solution, the critical factor referred to is that the europium present is present in a solid solution, whether it be present in solid solution in one or more phases. The term "luminophor" is used herein in both the singular and plural to describe the luminescent materials in the compositions of this invention, including those containing one, two, or more europium-containing solid solution phases.

As noted hereinbefore, the europium in the luminophors of this invention constitutes at least about 3%, but less than about 80% of the total rare earth ions, that is, the total of europium and the rare earth ions in the second rare earth component. In general, the brightness of the luminescent compositions prepared in accordance with this invention increases as the proportion of europium increases. With isomorphous components, luminescence increases until about equimolar amounts of the two rare earth components are present. Generally, at least about 10 percent of europium is preferred for optimum brightness of emission. The particular amount of europium which is present in the rare earth luminophors of the compositions of this invention depends to a large extent upon the other rare earth elements in the second rare earth component with which it is associated, and to some extent upon the particular oxygen-containing anion species which is present. For example, lanthanum or gadolinium tungstate and europium tungstate are isostructural and form substantially one phase systems at europium concentrations of about 3 to 80%. On the other hand, in yttrium-, scandium-, or lutetium-europium luminophors, most of which are not isostructural, a second phase usually forms at high europium concentrations. For example, with yttrium tungstate, a second phase forms at about 20 to 30 mole percent europium, based on the total rare earth ions, where the range of solubility of the europium tungstate is exceeded. Thus, the luminophors of this invention are solid solutions of an europium compound and at least one cognate compound of a rare earth element in the aforementioned rare earth component, the percentage of europium being in the range of about 3 to 80 mole percent based on the total rare earth ions present, the maximum europium concentration in those systems in which the europium and cognate rare earth compound are isostructural being less than about 80 mole percent, and, in those systems in which the europium and cognate rare earth compound are not isostructural, being no greater than the maximum solubility of the europium component in the second rare earth component in each such phase.

Illustrative solid solutions comprising the luminophors of this invention are:

$(La_{1-x}Eu_x)_2O_3 \cdot 3WO_3$ with $X=.05$ to $0.8$
$(Gd_{1-x}Eu_x)_2O_3 \cdot 3WO_3$ with $X=.05$ to $0.8$
$(Y_{1-x}Eu_x)_2O_3 \cdot 3WO_3$ with $X=.05$ to $0.2$
$(Sc_{1-x}Eu_x)_2O_3 \cdot 3WO_3$ with $X=0.1$ to $0.2$
$(Lu_{1-x}Eu_x)_2O_3 \cdot 3WO_3$ with $X=0.1$ to $0.2$
$(Tb_{1-x}Eu_x)_2O_3 \cdot 3WO_3$ with $X=0.2$ to $0.8$
$(Gd_{1-x}Eu_x)_2O_3 \cdot WO_3$ with $X=0.1$ to $0.2$
$(Y_{1-x}Eu_x)_2O_3 \cdot WO_3$ with $X=.03$ to $0.2$
$(Lu_{1-x}Eu_x)_2O_3 \cdot WO_3$ with $X=0.1$ to $0.2$
$(La_{1-x}Eu_x)_2O_3 \cdot 1/2MoO_3$ with $X=0.1$ to $0.6$
$(La_{1-x}Eu_x)_2O_3 \cdot MoO_3$ with $X=0.1$ to $0.6$
$(La_{1-x}Eu_x)_2O_3 \cdot 3MoO_3$ with $X=0.2$ to $0.8$
$(Gd_{1-x}Eu_x)_2O_3 \cdot MoO_3$ with $X=.05$ to $0.6$
$(Gd_{1-x}Eu_x)_2O_3 \cdot 3MoO_3$ with $X=0.1$ to $0.6$
$(Gd_{1-x}Eu_x)_2O_3 \cdot 4MoO_3$ with $X=0.3$ to $0.8$
$(Gd_{1-x}Eu_x)_2O_3 \cdot 7MoO_3$ with $X=0.3$ to $0.8$
$(Gd_{1-x}Eu_x)_2O_3 \cdot 8MoO_3$ with $X=0.6$ to $0.8$
$(Y_{1-x}Eu_x)_2O_3 \cdot 3MoO_3$ with $X=0.1$ to $0.3$
$(La_{1-x}Eu_x)_2O_3 \cdot 3B_2O_3$ with $X=.05$ to $0.8$
$(Y_{1-x}Eu_x)_2O_3 \cdot B_2O_3$ with $X=0.1$ to $0.6$
$(Gd_{1-x}Eu_x)_2O_3 \cdot P_2O_5$ with $X=0.1$ to $0.6$
$(La_{1-x}Eu_x)_2O_3 \cdot GeO_2$ with $X=0.1$ to $0.6$
$(Gd_{1-x}Eu_x)_2O_3 \cdot GeO_2$ with $X=0.1$ to $0.6$
$(Y_{1-x}Eu_x)_2O_3 \cdot GeO_2$ with $X=0.1$ to $0.2$
$(Y_{1-x}Eu_x)_2O_3 \cdot Ga_2O_3$ with $X=0.1$ to $0.2$
$(Y_{1-x}Eu_x)_2O_3 \cdot 5/3Ga_2O_3$ with $X=0.1$ to $0.2$
$(La_{1-x}Eu_x)_2O_3$ with $X=.05$ to $0.4$
$(Gd_{1-x}Eu_x)_2O_3$ with $X=.05$ to $0.4$
$(Tb_{1-x}Eu_x)_2O_3$ with $X=0.1$ to $0.2$
$(Y_{1-x}Eu_x)_2O_3$ with $X=0.1$ to $0.2$
$(Sc_{1-x}Eu_x)_2O_3$ with $X=0.1$ to $0.2$
$(Lu_{1-x}Eu_x)_2O_3$ with $X=0.1$ to $0.2$
$(La_ySm_zEu_x)_2O_3 \cdot 3WO_3$ with $x$, $y$ and $z=0.2$ to $0.5$ and $x+y+z=1$
$(La_yTb_zEu_x)_2O_3 \cdot 3WO_3$ with $x$, $y$ and $z=0.2$ to $0.5$ and $x+y+z=1$
$(La_yGd_zEu_x)_2O_3 \cdot 3WO_3$ with $x$, $y$ and $z=0.2$ to $0.5$ and $x+y+z=1$
$(La_yDy_zEu_x)_2O_3 \cdot 3WO_3$ with $x$, $y$ and $z=0.2$ to $0.5$ and $x+y+z=1$
$(Gd_ySm_zEu_x)_2O_3 \cdot 3WO_3$ with $x$, $y$ and $z=0.2$ to $0.5$ and $x+y+z=1$
$(Gd_yTb_zEu_x)_2O_3 \cdot 3WO_3$ with $x$, $y$ and $z=0.2$ to $0.5$ and $x+y+z=1$
$(Gd_yDy_zEu_x)_2O_3 \cdot 3WO_3$ with $x$, $y$ and $z=0.2$ to $0.5$ and $x+y+z=1$
$(Tb_ySm_zEu_x)_2O_3 \cdot 3WO_3$ with $x$, $y$ and $z=0.2$ to $0.5$ and $x+y+z=1$
$(Tb_yDy_zEu_x)_2O_3 \cdot 3WO_3$ with $x$, $y$ and $z=0.2$ to $0.5$ and $x+y+z=1$ In relating the formula $(RE_{1-x}Eu_x)_2O_3 \cdot A$ to solid solutions above bearing an oxyanion, A, it should be noted that in any particular solid solution the ratio of A to the remainder of the constituents, that is, to $(RE_{1-x}Eu_x)_2O_3$, is fixed; however, depending upon the particular oxyanionic species employed, several different solid solutions with different ratios of A to $(RE_{1-x}Eu_x)_2O_3$ can be prepared. Thus, for example, as indicated above, in the system $Gd_2O_3$-$Eu_2O_3$-$MoO_3$, separate and distinct solid solutions wherein A is $1MoO_3$, $3MoO_3$, $4MoO_3$, $7MoO_3$ and $8MoO_3$ can be prepared.

The luminophors employed in the compositions of this invention and described above can be characterized by conventional X-ray powder diffraction techniques. X-ray spectra can be conveniently determined on a Norelco X-ray diffraction unit using a recording spectrometer, CuK$_\alpha$ radiation, 1% slits, a nickel filter and a scan rate of 1° of 2$\theta$/min. If greater resolution is desired, a Guinier camera can be employed. The X-ray patterns of each of the families of the solid solutions in compositions of this invention are characteristic thereof and are different from the patterns of both the individual components in the solid solutions and the reactants leading to their formation. For instance, the diffraction patterns are different for solid solutions of La-Eu tungstates as compared to mixtures of the same La and Eu tungstates. This fact is illustrated in FIGURES 1 and 2 wherein FIGURE 1 is an X-ray pattern of an equimolar mixture of $La_2O_3 \cdot 3WO_3$ and $Eu_2O_3 \cdot 3WO_3$ and FIGURE 2 is an X-ray pattern for the solid solution $(La_{0.5}Eu_{0.5})_2O_3 \cdot 3WO_3$. In the X-ray diffraction patterns in the accompanying drawings, the $\theta$ term represents the angle of the reflected beams. Similarly, if $(La_{0.5}Eu_{0.5})_2O_3 \cdot 3WO_3$ is prepared by reaction of lanthanum oxide, europium oxide and tungsten trioxide, the resulting pattern of the product of this reaction will be different from that of either europium oxide, lanthanum oxide or tungsten trioxide. In a given series of solid solutions differing only in europium concentration, the X-ray patterns of the series will be substantially similar differing only in a slight and gradual shift in the characterizing peaks as the europium concentration increases.

Figure 4:
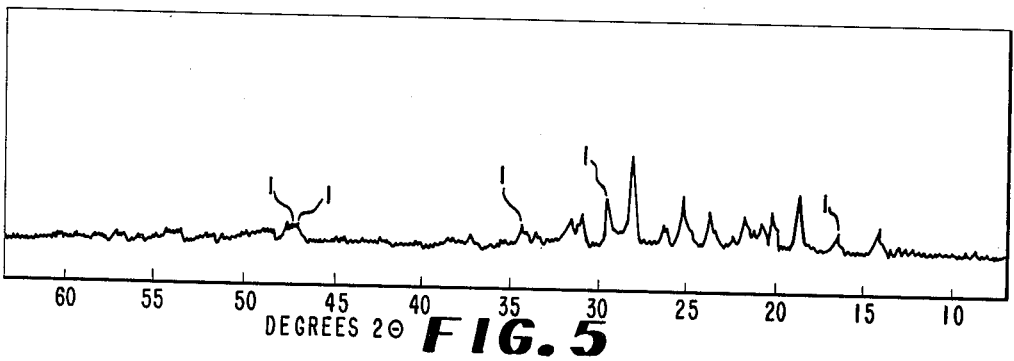
Figure 5:
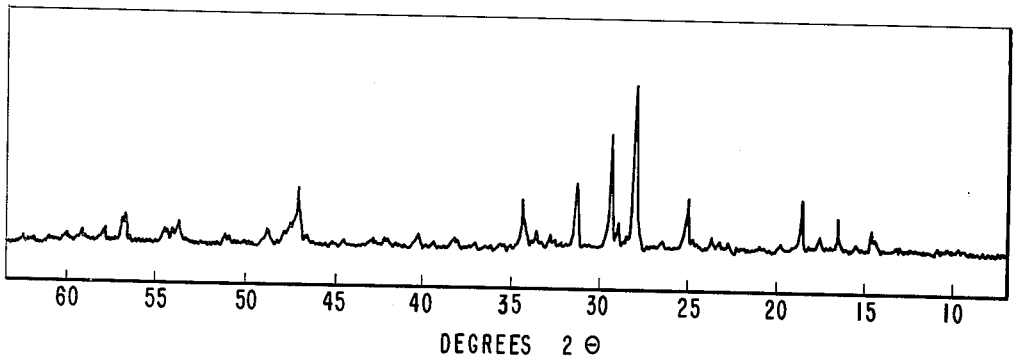

As has been noted hereinbefore, in many cases a one-phase luminophor is obtained with all europium concentrations within the limits specified hereinbefore, while with other luminophors, a new phase appears at the limit of solubility of europium in the crystal lattice. The presence of this new phase is indicated by the appearance of a new X-ray pattern impressed upon that of the first and characteristic of that of the new phase. The above is illustrated by FIGURES 3, 4 and 5. FIGURE 3 shows the X-ray pattern for the one-phase, solid solution system

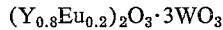

$(Y_{0.8}Eu_{0.2})_2O_3 \cdot 3WO_3$

FIGURE 4 shows the X-ray pattern for a similar system corresponding stoichiometrically to $(Y_{0.7}Eu_{0.3})_2O_3 \cdot 3WO_3$ wherein the limit of solubility has been exceeded and a new phase, indicated, for example, by the lines at 1 in the pattern, appears. FIGURE 5 shows the X-ray pattern for $Eu_2O_3 \cdot 3WO_3$, which pattern is characteristic of the new phase indicated in FIGURE 4.

The maximum solubility of the europium component is readily determined from the proportions of materials employed in preparing the composition in which the new phase first appears, that is, the appearance of the new phase indicates that composition in which solubility is just exceeded. Also, as noted hereinbefore, depending upon the nature and proportion of oxyanion contributing constituent used in forming a luminophor, several different luminescent solid solutions may result. For example, in the $Y_2O_3$-$Eu_2O_3$-$WO_3$ system, depending on the proportion of tungsten trioxide employed

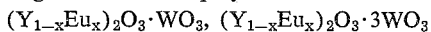

$(Y_{1-x}Eu_x)_2O_3 \cdot WO_3$, $(Y_{1-x}Eu_x)_2O_3 \cdot 3WO_3$ or both, can be obtained. Each of these solid solutions has a separate and distant X-ray diffraction pattern. The fact that each of the aforementioned materials is a distinct solid solution of rare earth compounds of definite rare earth/anion composition and not merely a mixture of the respective yttrium-europium components is determined by preparing a series of products of constant rare earth composition and varying proportions of the anionic-contributing species and noting the changes in the X-ray patterns of the compositions obtained. Taking the example above, the solid solution $(Y_{0.8}Eu_{0.2})_2O_3 \cdot 3WO_3$ is characterized by one diffraction pattern and the solid solution $(Y_{0.8}Eu_{0.2})_2O_3 \cdot WO_3$ is characterized by a second pattern. The product formed, for example, wherein the ratio of rare earth oxide to $WO_3$ is intermediate between 1:1 and 1:3, is characterized by lines representing both of the aforementioned solid solution phases. The composition of each of the "pure" phases above is determined from the proportions of reactants at the point in the series wherein only lines representing one solid solution (one phase) appear and those indicating the presence of any other solid solution are not present.

As is recognized in the art, X-ray powder patterns may not reveal the presence of a phase unless about 5% of that phase is present. Accordingly, it is possible, though not likely, that stated formulae indicated herein may deviate by an amount consistent with the aforementioned limitation and should be so interpreted.

As stated hereinbefore, the products of this invention are prepared by mixing starting materials comprising a europium component and a second rare earth component, the starting materials including, either as separate component or as part of the rare earth components, a component which contributes an oxygen-containing anion, and thereafter heating the resulting mixture at elevated temperatures. As indicated hereinbefore, a reaction temperature of at least about 700° C., and usually at least about 900° C., is employed; however, since the reaction time decreases as the reaction temperature increases, to insure complete reactions in practical periods of time, high reaction temperatures approaching, e.g., within 100° C. of, but in any case below, the temperature at which localized fusion of the reaction mass begins are preferred. If relatively low-melting eutectics are formed during the reaction, it may be desirable to heat the reaction mixture for a period at, e.g., 700–900° C., then regrind the resulting product and finish the reaction at a higher temperature.

The rare earth components are preferably introduced into the reaction mixture as oxides. However, rare earth components which decompose to the oxide on heating, for example, rare earth hydroxides, oxalates, carbonates, citrates, acetates and tartrates can be employed. In the case of those luminophors of this invention of the formula $(RE_{1-x}Eu_x)_2O_3$, the rare earth-containing components will be the only reactants required. The oxyanion-contributing component also is preferably introduced in the form of an oxide such as, for example, tungsten oxide, molybdenum oxide, boron oxide, phosphorus pentaoxide, gallium oxide and germanium oxide. However, the oxyanion-contributing reactant need not be necessarily in the form of an oxide. It can be, for example, in the form of a compound such as tungstic acid, molybdic acid, ammonium tungstate, ammonium borate and ammonium phosphate which on ignition is converted to the oxide. Alternatively, although less preferred, the solid solutions can be prepared by mixing each of the "preformed" components of the solid solution and heating at elevated temperatures. For example, the luminophor

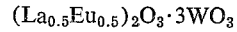

$(La_{0.5}Eu_{0.5})_2O_3 \cdot 3WO_3$ can be prepared from equimolar quantities of lanthanum tungstate ($La_2O_3 \cdot 3WO_3$) and europium tungstate

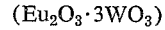

$(Eu_2O_3 \cdot 3WO_3)$

Reactants are preferably introduced in the form of finely ground particulate material, preferably having a particle size of less than 10 microns.

The quantities of reactants employed in preparing the luminophors of this invention are preferably approximately stoichiometric based on the desired composition of the final product. Thus, for example, in preparing the product $(La_{0.5}Eu_{0.5})_2O_3$, an equimolar ratio of lanthanum oxide and europium oxide would be employed. If the anion contributing constituent is one which absorbs incident or emitted radiation, for example, the green colored tungstic oxide, excess of such constituent tends to yield products with somewhat decreased luminescence. Hence, although slight excesses of such reactants are tolerable, preferably slightly less than the stoichiometric amount thereof is employed. Thus, for example, to prepare products of the formula $(RE_{1-x}Eu_x)_2O_3 \cdot 3WO_3$, for one mole of total rare earth oxide (including europium oxide), it is preferred to employ 2.8 to 2.9 moles of tungsten-contributing reactant. Where the anion-contributing reactant is, for example, a colorless material such as boron oxide, somewhat greater quantities of such reactant over the stoichiometric proportions, for example, 10 or 20% excess, can be tolerated, since the excess boron oxide in the resulting products merely acts as an inert diluent. In general, provided that all of the europium occurs in the final product in solid solution, excess rare earth component has no deleterious effect.

As noted hereinbefore, in some systems such as yttrium europium tungstate, a second phase appears at relatively high europium content, for example, in the yttrium europium system, at about 20 to 30% europium, based on the total rare earth ions present. An excess of the europium contributing constituent over that necessary to yield the desired luminophor can be employed, although again, stoichiometric proportions which yield compositions containing substantially only the desired luminophor are preferred. In essence, this second phase which appears after the limit of solubility of the europium component is exceeded acts as an inert diluent; proportions of such second phase, for example, a few percent based on the total composition, can be tolerated and still provide a brightly luminescent composition.

The particular combination of rare earth elements employed in the luminophors described herein and the large number of emitting europium ions which can be and are therein yield compositions in accordance with this invention of unusual brightness. On excitation, the products of this invention emit a bright red light. Although the products of this invention all emit on excitation by ultraviolet light, the emission on excitation by different wave lengths of ultraviolet light or on being subjected to other types of excitation, for example, cathode rays, varies somewhat from luminophor to luminophor. For example, the luminophor $(Y_{0.8}Eu_{0.2})_2O_3 \cdot 3WO_3$ emits very brightly red under excitation by cathode rays while the luminophor $(Gd_{0.6}Eu_{0.4})_2O_3 \cdot 3WO_3$ is not excited appreciably by cathode rays but emits very brightly under excitation by 2537 A. ultraviolet light; the luminophor $(Y_{0.85}Eu_{0.15})_2O_3 \cdot WO_3$ emits more brightly under excitation by 3660 A. than 2537 A. ultraviolet light. Dependence of intensity of emission on temperature also varies from luminophor to luminophor. For example, the brightness of

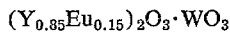

increases with temperatures to above 300° C., while the luminescence from $(La_{0.8}Eu_{0.2})_2O_3 \cdot 3WO_3$ decreases with temperature and has, for the most part, been thermally quenched by 400° C.

In addition to the foregoing, the products of this invention are remarkably insensitive by luminophor standards to impurities, both during preparation and during use.

As noted hereinbefore, the luminescent articles of this invention comprise at least one of the aforementioned luminophors, optionally in a mixture with conventional luminescent materials, intimately associated or in adherent contact with a protective layer of a material transparent to radiation emitted by the aforementioned luminophors, that is, visible, and particularly red light. The particular structure of the luminescent articles and the manner in which the luminophor is embodied therein depends to a great extent upon the utility for which such articles are to be used. The luminophor, for example, can be embedded in the transparent material, adhered to one or more surfaces thereof, combined with just sufficient binder to hold the luminophor particles together and sandwiched between two layers of transparent material, or a combination of these. More specifically, for example, in luminescent signs, the luminophor can be embedded in a polymeric material transparent to incident and emitted radiation as shown in FIGURE 7 and, for example, used as such or adhered to a signboard or the like. In fluorescent lights, the luminophor is conveniently merely adhered to the inner surface of a fluorescent light tube as indicated schematically in FIGURE 6. In cathode ray tubes, the luminophor can be adhered to the inner surface of the glass face plate and, if desired, additional layers, for example, of polymeric material or aluminum transparent to incident radiation applied thereover.

The luminophors can be associated with one or more protective layers transparent to emitted radiation. For example, the luminophor can be combined with binder and sandwiched between two or more adherent protective layers as shown in FIGURE 8, or the luminophor and binder therefor can be coated on the surface of a material transparent to emitted radiation. The shape of the luminescent articles is not critical. They can be flat as in luminescent signs, or curved as in fluorescent lights and cathode ray tubes, or even in the form of blocks or cubes which can be used, for example, as raised letters on signs. Examples of luminescent articles prepared in accordance with this invention are fluorescent lights; high pressure mercury vapor lamps, e.g., for street lighting; radiation detectors; luminescent signs, markers and identification devices; TV tubes, cathode ray oscillographs and other oscilloscopes; electron microscope viewing windows; luminescent sheets, films, coatings, and other shaped articles.

Examples of materials transparent to radiation emitted by the aforementioned phosphors are organic polymeric materials such as homopolymers and copolymers of alkyl acrylates and methacrylates such as methyl methacrylate; polyvinyl acetate; polyethylene; chlorosulfonated polyethylene; polypropylene; polystyrene; polyepoxides; polyesters such as polyethylene terephthalate; polyacrylonitrile; homopolymers and copolymers of vinyl chloride; polyvinyl alcohol; cellulose derivatives such as nitrocellulose and ethyl cellulose; inorganic materials such as various glasses, including silicate and borate glasses, and transparent crystalline materials such as lithium fluoride and sodium chloride; as well as various compatible mixtures thereof.

The subject invention relates to the use of the aforementioned luminescent materials in the aforementioned articles. The particular method of fabrication of such articles is not the essence of this invention; any of the conventional techniques therefor can be employed. However, by way of illustration, the luminophors mentioned hereinbefore can be finely ground and, if desired, mixed with other luminescent materials such as calcium tungstate, barium-lead sulfate, antimony- and manganese-activated calcium halophosphate, selenium-activated zinc sulfide, manganese-activated zinc orthosilicate or a mixture thereof to yield products emitting light of the desired color balance. As is conventional in the art, for example, the resulting compositions can be dispersed in a solution or dispersion of a binder, for example, a binder of one or more of the aforementioned materials transparent to emitted radiation. The resulting compositions then can be coated onto a surface, for example, a signboard, and solvent evaporated therefrom to yield a luminescent coating wherein luminophor is embedded in a layer of binder transparent to incident and emitted radiation. Such dispersions of luminophor and binder can also be cast into self-supporting sheets and films.

Fluorescent lights can be prepared, for example, by milling finely divided, for example 3- to 12-micron, luminorphor of this invention, together with other luminescent materials yielding the desired color balance, with low viscosity ethyl cellulose of nitrocellulose dissolved in xylol and dibutylphthalate. The resulting composition then can be applied to the inner surface of a standard fluorescent light tube, for example, by conventional flush, flow or spray methods, and dried. Finally, the coated tube can be heated to a temperature just below the melting point of the glass tube, usually a temperature greater than 700° C., to oxidize the organic binder and adhere the luminophor to the glass. The resulting product of this invention comprises a layer of luminophor adhered to the inner surface of a tubular protective layer of glass. The tubes prepared as described above can be fabricated into a finished fluorescent light by standard procedures such as, for example, those described in the "Encyclopedia of Chemical Technology," volume 8, Interscience Publishers, Inc., pages 202–206 (1952).

Cathode ray tubes can be prepared, for example, by first introducing a cushioning layer, for example, of water or a mixture of alcohol and ether, onto the inner surface face plate of the tube, then distributing, for example, spraying, a solution of the luminophor in water or alcohol over the surface of the cushioning layer and allowing the luminescent material to precipitate onto the face plate. Next, the cushioning liquid can be withdrawn from the tube and the resulting product dried. Subsequently, further coatings, for example, of sodium or potassium silicate, nitrocellulose and/or aluminum can be applied to the inner surface of the luminophor layer by conventional procedures such as those described in U.S. Patent No. 2,710,262.

The concentration of luminophor and binder used in preparing products of this invention as described above varies greatly with the particular article being fabricated. Thus, for example, in preparing luminescent coating compositions wherein the final article comprises luminophor embedded in the binder, relatively large proportions of binder are employed so that in the resulting product the binder encases and protects the luminophor. In such cases, as low as 50% or less, but usually on the order of 70 to 90% of binder based on the weight of binder and luminophor is employed. In the fabrication of fluorescent lights, the solution of binder merely serves as an application medium for the luminophor and is completely burned off during fabrication of such lights as described above. Normally, relatively dilute concentrations of binder are employed. If the luminophor is to be sandwiched between two protective layers, it may be desirable to just sufficient binder to hold the luminophor particles together, for example, 2 to 5% based on the weight of luminophor and binder.

In the following examples which illustrate this invention, parts and percentages are by weight unless otherwise indicated.

EXAMPLE I

Tungstic oxide (1.0000 parts), 0.4188 part of gadolinium oxide ($Gd_2O_3$) and 0.1355 part of europium oxide ($Eu_2O_3$) are mixed on a vibrating mixer for 3 minutes. The reaction mixture corresponds to a mole ratio of gadolinium oxide, europium oxide and tungstic oxide of 0.75/0.25/2.8, respectively. The resulting mixture is pressed into a pellet which is heated for four hours at 1000° C. in static air in a platinum-lined alumina boat. The resulting product consists essentially of a colorless, single solid solution phase having the formula:

$$(Gd_{0.75}Eu_{0.25})_2O_3 \cdot 3WO_3$$

When the spectral emission characteristics of the above luminophor upon excitation with 2537 A. radiation are measured with a Dumont Type 6365 infrared photomultiplier tube as detector and a scan from 4400 to 9200 A., the following peaks appear:

| λ (A.) | I/I₀ |
|---|---|
| 5940 | 10 |
| 6160 | 100 |
| 6500 | 10 |
| 7060 | 20 |

If the procedure described above is repeated except that the proportion of europium is altered to yield products of the formula

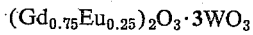
$$(Gd_{1-x}Eu_x)_2O_3 \cdot 3WO_3$$

wherein $x$ is 0.05, 0.15, 0.50 and 0.75, single-phase luminophors are obtained having substantially the same emission spectra.

The product of this example first described above has a qualitative brilliance rating of about 5. In this qualitative scale, zero corresponds to products with no luminescence, 1 corresponds to products in which luminescence is just bearly visible on excitation with ultraviolet light of 2537 A., etc., and 5 corresponds to a brilliance comparable to the most brilliant commercial (though not red) phosphors such as barium-lead sulfates, calcium tungstates and copper-activated zinc cadmium selenides. The brilliance ratings of the products described above wherein $x$=0.05, 0.15, 0.50 and 0.75 are all 5.

EXAMPLE II

A luminescent composition consisting essentially of a single solid solution phase having the formula:

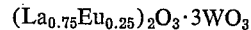
$$(La_{0.75}Eu_{0.25})_2O_3 \cdot 3WO_3$$

is prepared by the general procedure described in Example I from 1.5057 parts of lanthanum oxide, 0.5422 part of europium oxide and 4.0000 parts of tungstic oxide. The resulting bright red emitting luminophor has an emission spectra on excitation 2537 A. radiation as follows:

| λ (A.) | I/I₀ |
|---|---|
| 5940 | 15 |
| 6170 | 100 |
| 6530 | 5 |
| 7035 | 20 | and a brilliance rating of 5. Similar spectra are obtained with products prepared as described above wherein the percent of europium based on the total rare earth cations present is 5, 10, 20 40 and 50%, except that at 5% the line at 6530 A. is not distinguishable. Brilliance ratings of such products are all 5.

As noted hereinbefore, the X-ray pattern for the luminophor $(La_{0.5}Eu_{0.5})_2O_3 \cdot 3WO_3$ described in this example is shown in FIGURE 2. The comparative composition, the X-ray pattern of which is shown in FIGURE 1, consists of an equimolar mixture $La_2O_3 \cdot 3WO_3$ and $Eu_2O_3 \cdot 3WO_3$. This mixture is prepared by first mixing 0.4685 part of lanthanum oxide with 1.0000 part of tungstic oxide and separately mixing 0.5061 part of europium oxide and 1.0000 part of tungstic oxide, separately heating each of the resulting mixtures at 1000° C. for four hours, and finally grinding and intimately mixing the resulting $La_2O_3 \cdot 3WO_3$ and $Eu_2O_3 \cdot 3WO_3$. The final product has a brilliance rating of 1+ on excitation with 2537 A. ultraviolet light.

EXAMPLE III

A luminescent composition consisting essentially of a single solid solution phase having the formula

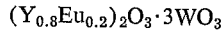
$$(Y_{0.8}Eu_{0.2})_2O_3 \cdot 3WO_3$$

is prepared by the procedure described in Example I from 0.2783 part of yttrium oxide, 0.1084 part of europium oxide and 1.0000 part of tungstic oxide. The composition has a relative brilliance of 5 on excitation with 2537 A. ultraviolet light. As noted hereinbefore, the X-ray pattern for this composition is shown in FIGURE 3.

The procedure indicated above is repeated except that 1.0000 part of tungstic oxide, 0.1912 part of scandium oxide and 0.0542 part of europium oxide are employed. The resulting product on excitation with 2537 A. ultraviolet light has a brilliance rating of 5 and consists essentially of a single solid solution phase having the formula

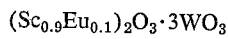
$$(Sc_{0.9}Eu_{0.1})_2O_3 \cdot 3WO_3$$

The procedure indicated above is again repeated except that 1.0000 part of tungstic oxide, 0.5517 part of lutetium oxide and 0.0542 part of europium oxide are employed. The resulting product consisting essentially of a single solid solution phase having the formula $$(Lu_{0.9}Eu_{0.1})_2O_3 \cdot 3WO_3$$

and has a brilliance rating on excitation with 2537 A. ultraviolet light of 4.

The procedure described above is repeated except that 0.2879 part of $Tb_4O_7$ (common "terbium oxide"), 0.2710 part of europium oxide and 1.0000 part of tungstic oxide are employed. The resulting product on excitation with 2537 A. ultraviolet light has a brilliance rating of 5 and consists essentially of a single solid solution phase having the formula $$(Tb_{0.5}Eu_{0.5})_2O_3 \cdot 3WO_3$$

EXAMPLE IV

A bright red emitting luminescent composition consisting essentially of a single solid solution phase having the formula $$(Y_{0.8}Eu_{0.2})_2O_3 \cdot 3MoO_3$$

is prepared by thoroughly mixing 0.4184 part of yttrium oxide, 0.1630 part of europium oxide and 1.0000 part of molybdic oxide, pressing the above finely ground mixture into a pellet and heating the resulting product in static air for four hours at 1000° C. The relative brightness rating of the resulting composition is 4 on excitation with 2537 A. ultraviolet light.

The procedure described above is repeated except that 0.5438 part of gadolinium oxide, 0.1760 part of europium oxide and 0.8061 part of molybdic oxide are employed. A bright red emitting luminophor consisting essentially of a single solid solution phase having the formula $$(Gd_{0.75}Eu_{0.25})_2O_3 \cdot 3MoO_3$$

is obtained. This luminescent composition has a brightness rating on excitation with 2537 A. ultraviolet light of 5.

The procedure described above is repeated except that 0.4888 part of lanthanum oxide, 0.1760 part of europium oxide and 0.8061 part of molybdic oxide are employed. A bright red emitting luminophor consisting essentially of a single solid solution phase having the formula $$(La_{0.75}Eu_{0.25})_2O_3 \cdot 3MoO_3$$

is obtained. The brightness rating of the resulting product is 5 on excitation with 2537 A. ultraviolet light.

EXAMPLE V

A bright red emitting luminophor is prepared by intimately mixing 0.8492 part of yttrium oxide, 0.3309 part of europium oxide and 0.3273 part of boron oxide, pelleting the mixture and heating the pelleted product at 1100° C. for 4 hours. The resulting product consists essentially of a solid solution having the formula $$(Y_{0.8}Eu_{0.2})_2O_3 \cdot B_2O_3$$

and has a brilliance rating of 5 on excitation with 2537 A. ultraviolet light.

The procedure described above is repeated except that 0.8311 part of lanthanum oxide, 0.0986 part of europium oxide and 0.5850 part of boron oxide are employed and the reaction is carried out at 1000° C. for 4 hours. The resulting bright red emitting luminophor consists essentially of a single solid solution phase having the formula $$(La_{0.9}Eu_{0.1})_2O_3 \cdot 3B_2O_3$$

and has a brilliance rating of 5 on excitation with 2537 A. ultraviolet light.

The procedure described above is repeated except that 0.6191 part of lanthanium oxide, 0.0352 part of europium oxide and 0.8357 part of boron oxide are employed and the reaction is carried out at 900° C. for 4 hours. The resulting bright red emitting luminophor has a brilliance rating of 5+ on excitation with 2537 A. ultraviolet light and consists essentially of a single solid solution phase having the formula $$(La_{0.95}Eu_{0.05})_2O_3 \cdot 3B_2O_3$$

Excess boron oxide over that required to form the solid solution just mention vaporizes during the reaction or remains as a fused diluent glass in the final product.

EXAMPLE VI

Bright red emitting luminophors each consisting essentially of a single solid solution phase of the formula shown below are prepared by the general procedures shown in the preceding examples from the following materials using the indicated reaction times and temperatures:

| Solid Solution | Parts of Reactants | | | Reaction Conditions | | Brilliance Rating (UV Excitation, A.) |
|---|---|---|---|---|---|---|
| | $RE_2O_3$ | $Eu_2O_3$ | Oxyanion Contributing Reactant | Temp., °C. | Time, Hrs. | |
| $(La_{0.8}Eu_{0.2})_2O_3 \cdot 1/2MoO_3$ | 0.9906 | 0.2675 | 0.2735 ($MoO_3$) | 1,400 | 4 | |
| $(La_{0.8}Eu_{0.2})_2O_3 \cdot MoO_3$ | 0.8342 | 0.2253 | 0.4606 ($MoO_3$) | 1,300 | 4 | |
| $(La_{0.4}Eu_{0.6})_2O_3 \cdot 3MoO_3$ | 0.2607 | 0.4224 | 0.8637 ($MoO_3$) | 900 | 4 | 5 (2537) |
| $(Gd_{0.8}Eu_{0.2})_2O_3 \cdot MoO_3$ | 0.8700 | 0.2112 | 0.4319 ($MoO_3$) | 1,400 | 2 | 5 (3660) |
| $(Gd_{0.7}Eu_{0.3})_2O_3 \cdot 3MoO_3$ | 0.4796 | 0.1996 | 0.8162 ($MoO_3$) | 900 | 2 | 5 (2537) |
| $(Gd_{0.6}Eu_{0.4})_2O_3 \cdot 4MoO_3$ | 0.3480 | 0.2253 | 0.9213 ($MoO_3$) | 800 | 2 | 5 (3660) |
| $(Gd_{0.7}Eu_{0.3})_2O_3 \cdot 7MoO_3$ | 0.2791 | 0.1162 | 1.1084 ($MoO_3$) | 700 | 4 | 5 (3660) |
| $(Gd_{0.2}Eu_{0.8})_2O_3 \cdot 8MoO_3$ | 0.0725 | 0.2816 | 1.1516 ($MoO_3$) | 750 | 4 | 4 (3660) |
| $(Gd_{0.8}Eu_{0.2})_2O_3 \cdot P_2O_5$ | 0.9658 | 0.2344 | 0.4727 ($P_2O_5$) | 1,200 | 4 | 5 (2537) |
| $(La_{0.8}Eu_{0.2})_2O_3 \cdot GeO_2$ | 0.8993 | 0.2419 | 0.3609 ($GeO_2$) | 1,400 | 4 | 5 (2537) |
| $(Gd_{0.8}Eu_{0.2})_2O_3 \cdot GeO_2$ | 0.9281 | 0.2253 | 0.3347 ($GeO_2$) | 1,400 | 4 | 5 (2537) |
| $(Y_{0.8}Eu_{0.2})_2O_3 \cdot 2GeO_2$ | 0.5872 | 0.2288 | 0.6799 ($GeO_2$) | 1,400 | 4 | 5 (2537) |
| $(Y_{0.8}Eu_{0.2})_2O_3 \cdot Ga_2O_3$ | 0.6143 | 0.2394 | 0.6373 ($Ga_2O_3$) | 1,400 | 4 | 5+(2537) |
| $(Y_{0.8}Eu_{0.2})_2O_3 \cdot 5/3Ga_2O_3$ | 0.4878 | 0.1901 | 0.8435 ($Ga_2O_3$) | 1,400 | 4 | 5+(2537) |

EXAMPLE VII

This example illustrates luminophors of the formula $$(RE_{1-x}Eu_x)_2O_3 \cdot A$$

wherein RE, $x$ and A have the meanings specified hereinbefore and RE consists of more than one rare earth element. Each of the luminophors consists essentially of a single solid solution phase and is prepared by heating an intimate pelleted mixture of quantities of rare earth oxides contributing the RE component indicated below with 0.1807 part of $Eu_2O_3$ and 1.0000 part of tungstic oxide for 4 hours at 1000° C.:

| Solid Solution | Parts $RE_2O_3$ |
|---|---|
| $(La_{0.33}Gd_{0.33}Eu_{0.33})_2O_3 \cdot 3WO_3$ | 0.1673—$La_2O_3$, 0.1861—$Gd_2O_3$ |
| $(La_{0.33}Tb_{0.33}Eu_{0.33})_2O_3 \cdot 3WO_3$ | 0.1673—$La_2O_3$, 0.1920—$Tb_4O_7$ |
| $(La_{0.33}Sm_{0.33}Eu_{0.33})_2O_3 \cdot 3WO_3$ | 0.1673—$La_2O_3$, 0.1790—$Sm_2O_3$ |
| $(La_{0.33}Dy_{0.33}Eu_{0.33})_2O_3 \cdot 3WO_3$ | 0.1673—$La_2O_3$, 0.1915—$Dy_2O_3$ |
| $(Gd_{0.33}Tb_{0.33}Eu_{0.33})_2O_3 \cdot 3WO_3$ | 0.1861—$Gd_2O_3$, 0.1920—$Tb_4O_7$ |
| $(Gd_{0.33}Sm_{0.33}Eu_{0.33})_2O_3 \cdot 3WO_3$ | 0.1861—$Gd_2O_3$, 0.1790—$Sm_2O_3$ |
| $(Gd_{0.33}Dy_{0.33}Eu_{0.33})_2O_3 \cdot 3WO_3$ | 0.1861—$Gd_2O_3$, 0.1915—$Dy_2O_3$ |
| $(Tb_{0.33}Sm_{0.33}Eu_{0.33})_2O_3 \cdot 3WO_3$ | 0.1920—$Tb_4O_7$, 0.1790—$Sm_2O_3$ |
| $(Tb_{0.33}Dy_{0.33}Eu_{0.33})_2O_3 \cdot 3WO_3$ | 0.1920—$Tb_4O_7$, 0.1915—$Dy_2O_3$ |

Each of the luminophors described above emitted a bright red light having a brilliance rating of 5 on excitation with 2537 A. ultraviolet light.

EXAMPLE VIII

Luminescent compositions of this invention consisting essentially of a single solid solution phase of the formulae indicated below are prepared by intimately mixing the following oxides with europium oxide, pelleting the resulting mixtures, and heating the pelleted products in static air in a platinum-lined boat for four hours at 1400° C.

| Solid Solution | Parts $RE_2O_3$ | Parts $Eu_2O_3$ | Brilliance Rating 2537 A. U.V. |
|---|---|---|---|
| $(Sc_{0.8}Eu_{0.2})_2O_3$ | 0.5528 | 0.3520 | 3 |
| $(Y_{0.8}Eu_{0.2})_2O_3$ | 0.9034 | 0.3520 | 5 |
| $(La_{0.8}Eu_{0.2})_2O_3$ | 1.3034 | 0.3520 | 3 |
| $(Gd_{0.8}Eu_{0.2})_2O_3$ | 1.4472 | 0.3520 | 5 |
| $(Lu_{0.8}Eu_{0.2})_2O_3$ | 1.5919 | 0.3520 | 4 |

EXAMPLE IX

A luminescent composition of this invention is prepared by heating together an intimate mixture of 0.2435 part of yttrium oxide, 0.1627 part of europium oxide and 1.0000 part of tungstic oxide for four hours at 1000° C. The resulting bright red emitting composition of this invention contains two phases. One phase is a solid solution luminophor phase of the formula $$(Y_{1-x}Eu_x)_2O_3 \cdot 3WO_3$$

wherein $x$ is between 0.2 and 0.3. The second phase is a diluent phase containing the excess europium tungstate over that soluble in the aforementioned luminophor phase. The brilliance rating of the above composition on excitation with 2537 A. ultraviolet light is 5. The X-ray pattern of the multiphase composition is shown in FIGURE 4.

As noted hereinbefore, the compositions of this invention can contain binder to facilitate formation of coherent luminescent films and coatings thereof, for example, in fluorescent lights, TV tubes and the like. Thus, for example, the products of this and the preceding examples can be finely ground and mixed with conventional organic and inorganic phosphor binders and, usually, solvent for the binder, to yield compositions of this invention readily adaptable for formation into coherent luminescent sheets, films, coatings and other shaped articles. Examples of such binders include organic polymeric binders such as nitrocellulose, polymethylmethacrylate, polyvinyl alcohol and polyethylene, inorganic binders such as sodium silicate and potassium silicate and other binders which are substantially transparent to emitted radiation and do not appreciably absorb ultraviolet light or other exciting radiation if, in the article fabricated therewith, the exciting radiation must pass through an appreciable portion of such binder. The following examples illustrate preparation of luminescent compositions of this invention and articles fabricated therewith.

EXAMPLE X 0.5 part of $(Y_{0.8}Eu_{0.2})_2O_3$ are added to 10 parts of a 20% solution in methyl ethyl ketone of polymethyl methacrylate and thoroughly blended to produce a homogeneous slurry. The resulting coating composition of this invention is applied to the surface of a glass plate and dried. When the glass plate is placed over a source of 2537 A. ultraviolet light with the coated surface facing the ultraviolet light source, the coating emits bright red light. The product of this invention described above consists of luminophor embedded in a protective layer of polymethyl methacrylate which is transparent to both the incident ultraviolet light and the emitted visible red light and which is in adherent contact with a second protective layer of glass.

Instead of coating the luminophor above onto a glass plate, it can be coated onto a signboard, for example, of wood or metal or glass in the form of letters, numbers or designs. In a like manner, the coating composition described above can be used to laminate two layers of glass in signs, markers or other indicating devices. Similarly, other polymeric materials such as other polyalkyl acrylates or methacrylates, polystyrene or polyvinyl acetate can be substituted for the polymethyl methacrylate.

EXAMPLE XI 0.5 part of $(Y_{0.8}Eu_{0.2})_2O_3 \cdot 3WO_3$ are dispersed in a 20% solution of polymethyl methacrylate in methyl ethyl ketone and applied to the inside surface of the viewing window of an R.C.A. type EMC electron microscope. After the coating has been dried, the window is replaced in its normal position on the electron microscope, the system is evacuated and the window is irradiated with cathode rays at 30 kilovolts. After a brief period, a bright red light emission is observed from the region of the viewing window where the luminophor coating is applied and irradiated with electrons.

In the example above, if an aqueous solution of an inorganic binder such as sodium or potassium silicate is employed instead of the polymethyl methacrylate solution described, similar results are obtained.

EXAMPLE XII

This example illustrates a method by which standard fluorescent lights can be prepared.

$$(Gd_{0.7}Eu_{0.3})_2O_3 \cdot 3MoO_3$$

prepared as previously described is finely ground and dispersed in a dilute lacquer, for example, of nitrocellulose or ethyl cellulose. If desired, in order to obtain a color balance, other luminophors such as manganese- and antimony-activated calcium halophosphates also can be dispersed therein. The resulting lacquer is next run through a standard glass fluorescent light tube and the coating deposited on the inside surface thereof is dried. Next, the coated tube is heated to the temperature, usually somewhat greater than 700° C., at which the cellulose lacquer is burned off and the tube somewhat softened, then the coated tube is cooled. For a standard 40-watt light (120 cm. long, 3.8 cm. dia.), about 1 to 4 grams of luminophor are deposited as just described, depending upon the particle size of the luminophor. The resulting product of this invention consists essentially of particles of luminophor firmly adhered to the inner surface of a tubular protective layer of glass. The remaining components of the fluorescent light, including the electrodes, terminals, mercury, etc., are assembled in the conventional manner.

If $(La_{0.8}Eu_{0.2})_2O_3 \cdot 3WO_3$, $(Gd_{0.8}Eu_{0.2})_2O_3 \cdot 3WO_3$ or $(Y_{0.9}Eu_{0.1})_2O_3 \cdot WO_3$ is used instead of the luminophor of this invention, described above, substantially similar results are obtained.

I claim:

1. A luminescent composition consisting essentially of substantially colorless crystalline luminophor having a melting point above about 700° C. and having the formula:

$$(RE_{1-x}Eu_x)_2O_3 \cdot A$$

wherein RE is at least one rare earth element selected from the group consisting of scandium, yttrium, lanthanum, samarium gadolinium, terbium, dysprosium and lutetium, about from 25 to 100 mole percent of RE being selected from the group consisting of scandium, yttrium, lanthanum, gadolinium, terbium and lutetium, $x$ is 0.03 to 0.8, and A is an inorganic oxyanion consisting of oxygen and one of the group consisting of tungsten, molybdenum, boron, silicon and phosphorus, the europium component being in solid solution with the RE component, the sole rare earth elements in said luminophor being present in said RE and Eu components.

2. A luminescent composition of claim 1 wherein A is an inorganic oxyanion consisting of oxygen and a Group VI B metal having an atomic number of 42–74.

3. A luminescent composition of claim 2 consisting essentially of one solid solution phase wherein europium constitutes at least about 10 mole percent of the total rare earth ions present in such solid solution.

4. A luminescent composition of claim 3 in which the rare earths therein are europium and lanthanum.

5. A luminescent composition of claim 3 in which the rare earths therein are europium and gadolinium.

6. A luminescent composition of claim 3 in which the rare earths therein are europium and lutetium.

7. A luminescent composition of claim 3 in which the rare earths therein are europium and scandium.

8. A luminescent composition of claim 3 in which the rare earths therein are europium and yttrium.

9. A luminescent composition of claim 3 in which the rare earths therein are europium and terbium.

References Cited by the Examiner

UNITED STATES PATENTS

| | | | |
|---|---|---|---|
| 2,467,689 | 4/1949 | Overbeek | 252—301.4 |
| 2,824,814 | 2/1958 | Jones et al. | 252—301.3 |
| 3,152,085 | 10/1964 | Ballman et al. | 252—301.4 |

OTHER REFERENCES

Kroger: Some Aspects of the Luminescence of Solids, Elsevier Publishing Co., Inc., New York, N.Y., 1948, pages 291, 294, 295, 296 and 297.

Kroger: "Some Aspects of the Luminescence of Solids," Elsevier Publishing Co., Inc., New York, page 291 applied, pp. 2, 60, and 253–261.

TOBIAS E. LEVOW, *Primary Examiner.*

JOSEPH R. LIBERMAN, MAURICE A. BRINDISI, *Examiners.*

R. D. EDMONDS, *Assistant Examiner.*